US012101220B2

(12) United States Patent
Nedungadi et al.

(10) Patent No.: US 12,101,220 B2
(45) Date of Patent: Sep. 24, 2024

(54) METHODS AND SYSTEMS FOR TROUBLESHOOTING NETWORK DEVICE

(71) Applicant: Nile Global, Inc., Cupertino, CA (US)

(72) Inventors: Promode Nedungadi, San Jose, CA (US); Suresh Katukam, Milpitas, CA (US); Vijay Bollapragada, Bangalore (IN); Arun Madupu, Bangalore (IN); Sumanth Narayana Reddy, Bangalore (IN); Ganesh Sathyanarayanan, Bangalore (IN)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/134,045

(22) Filed: Dec. 24, 2020

(65) Prior Publication Data
US 2022/0210003 A1 Jun. 30, 2022

(51) Int. Cl.
*H04L 41/069* (2022.01)
*H04L 41/0631* (2022.01)
*H04L 67/10* (2022.01)
*H04W 4/80* (2018.01)

(52) U.S. Cl.
CPC ........ *H04L 41/069* (2013.01); *H04L 41/0631* (2013.01); *H04L 67/10* (2013.01); *H04W 4/80* (2018.02)

(58) Field of Classification Search
USPC ........................................................ 307/216
See application file for complete search history.

(56) References Cited

U.S. PATENT DOCUMENTS

| | | | |
|---|---|---|---|
| 7,221,282 B1* | 5/2007 | Ross | G08B 25/10 |
| | | | 340/606 |
| 8,887,262 B1 | 11/2014 | Turner et al. | |
| 9,129,127 B2* | 9/2015 | Hubner | G06F 21/6218 |
| 9,173,115 B2 | 10/2015 | Sundareswaran et al. | |
| 9,769,734 B2 | 9/2017 | Goto | |
| 2005/0015501 A1* | 1/2005 | Kaplan | G07F 17/0014 |
| | | | 709/228 |
| 2005/0187940 A1* | 8/2005 | Lora | G06F 16/25 |
| 2006/0200356 A1* | 9/2006 | Wan | G06Q 30/0601 |
| | | | 705/26.1 |
| 2009/0052329 A1* | 2/2009 | Mahajan | G06F 40/143 |
| | | | 370/242 |
| 2009/0161556 A1* | 6/2009 | Qian | H04L 45/00 |
| | | | 370/242 |

(Continued)

OTHER PUBLICATIONS

"Research and Design of RFID-based Equipment Incident Management System for Industry 4.0", Cao et al., 4th International Conference on Electrical & Electronics Engineering and Computer Science (ICEEECS 2016). (Year: 2016).*

*Primary Examiner* — Schquita D Goodwin
*Assistant Examiner* — Jonathan A Sparks
(74) *Attorney, Agent, or Firm* — LOZA & LOZA, LLP

(57) ABSTRACT

Embodiments of a device and method are disclosed. In an embodiment, a method of network device troubleshooting involves at a cloud server, assigning a troubleshooting task for troubleshooting a network device deployed at a customer site to an operator, at the cloud server, receiving data regarding an issue in the network device that is gathered by the operator at the customer site, and, at the cloud server, recommending a remedy action for the issue in the network device to the operator based on the data regarding the issue in the network device.

10 Claims, 6 Drawing Sheets

(56) References Cited

U.S. PATENT DOCUMENTS

| | | | |
|---|---|---|---|
| 2013/0191885 A1* | 7/2013 | Hubner | H04L 41/5061 |
| | | | 709/217 |
| 2014/0028449 A1* | 1/2014 | Sigal | G08C 17/02 |
| | | | 340/12.5 |
| 2014/0278281 A1 | 9/2014 | Vaynriber et al. | |
| 2015/0172118 A1 | 6/2015 | Lin | |
| 2015/0327010 A1* | 11/2015 | Gottschalk | G05B 15/02 |
| | | | 455/456.1 |
| 2017/0010995 A1* | 1/2017 | Robinson | G06F 11/3648 |
| 2017/0374560 A1 | 12/2017 | Judge et al. | |
| 2018/0120973 A1 | 5/2018 | Tiwari et al. | |
| 2020/0036581 A1* | 1/2020 | Pannem | H04L 41/5074 |
| 2021/0044965 A1* | 2/2021 | Nambisan | H04W 12/50 |
| 2021/0278833 A1* | 9/2021 | Hafernik | G06Q 10/20 |

* cited by examiner

METHODS AND SYSTEMS FOR TROUBLESHOOTING NETWORK DEVICE

BACKGROUND

Network deployment, for example, enterprise network deployment, at a customer site typically involves a manual and lengthy process, which can take several weeks to months. For example, network deployment typical involves multiple steps, such as gathering requirements, network design, network implementation, network operation, and network optimization that are performed by network experts. A deployed network, such as a deployed enterprise network, may run into issue due to various reasons, which can cause prolonged network downtime (e.g., multiple hours). Typically, deep-level network expertise, for example, from a network expert (e.g., a network administrator), is needed to troubleshoot or debug issues in network devices. Frequently, troubleshooting or debugging network devices requires console access by a network administrator on site. For example, troubleshooting or debugging network devices can be performed by a network administrator by connecting to the network devices' console ports and diagnosing the network devices locally at a customer site, which may require specific configuration of the network administrator's end device such as a laptop. However, in many small offices and branches, it may be hard to find a network expert (e.g., a network administrator) to perform network device troubleshooting or debugging functions. In addition, getting a network expert (e.g., a network administrator) on-site consumes valuable time for resolving network device issues. Therefore, there is a need for network device troubleshooting technology that can troubleshoot network devices without solely relying on the expertise of a network expert.

SUMMARY

Embodiments of a device and method are disclosed. In an embodiment, a method of network device troubleshooting involves at a cloud server, assigning a troubleshooting task for troubleshooting a network device deployed at a customer site to an operator, at the cloud server, receiving data regarding an issue in the network device that is gathered by the operator at the customer site, and, at the cloud server, recommending a remedy action for the issue in the network device to the operator based on the data regarding the issue in the network device. Other embodiments are also described.

In an embodiment, the method further includes at the cloud server, receiving a report regarding the issue in the network device.

In an embodiment, the method further includes at the cloud server, detecting the issue in the network device.

In an embodiment, the method further includes at the cloud server, analyzing the issue in the network device using a troubleshooting rule set.

In an embodiment, at the cloud server, assigning the troubleshooting task for troubleshooting the network device deployed at the customer site to the operator includes transmitting information related to the troubleshooting task from the cloud server to a mobile application of a troubleshooting device of the operator.

In an embodiment, the data regarding the issue in the network device is gathered by the operator at the customer site through a Bluetooth connection with the network device.

In an embodiment, the operator is not a network expert.

In an embodiment, the operator is a layperson at the customer site.

In an embodiment, a method for network device troubleshooting involves at a troubleshooting device, receiving a troubleshooting task for troubleshooting a network device deployed at a customer site, at the customer site, pairing the troubleshooting device with the network device to receive data regarding an issue in the network device, sending the data regarding the issue in the network device from the troubleshooting device to a cloud server, at the troubleshooting device, receiving a recommendation for a remedy action for the issue in the network device from the cloud server, and at the customer site, performing the remedy action to address the issue in the network device.

In an embodiment, at the customer site, pairing the troubleshooting device with the network device to receive the data regarding the issue in the network device includes at the customer site, pairing the troubleshooting device with the network device through a Bluetooth connection between the network device and the troubleshooting device to receive the data regarding the issue in the network device.

In an embodiment, at the customer site, pairing the troubleshooting device with the network device through the Bluetooth connection between the network device and the troubleshooting device includes at the customer site, pairing the troubleshooting device with the network device through the Bluetooth connection between the network device and the troubleshooting device using a mobile application of the troubleshooting device.

In an embodiment, at the troubleshooting device, receiving the troubleshooting task for troubleshooting the network device deployed at the customer site includes receiving information related to the troubleshooting task at a mobile application of the troubleshooting device.

In an embodiment, the information related to the troubleshooting task includes location information of the network device and a list of network devices deployed at the customer site or to be deployed at the customer site.

In an embodiment, the troubleshooting device is a handheld wireless device.

In an embodiment, an operator of the troubleshooting device is not a network expert.

In an embodiment, a cloud server includes a device deployment module configured to assign a troubleshooting task for troubleshooting a network device deployed at a customer site to an operator, receive data regarding an issue in the network device that is gathered by the operator at the customer site, and recommend a remedy action for the issue in the network device to the operator based on the data regarding the issue in the network device and a deployment database connected to the device deployment module and configured to store a list of network devices deployed or to be deployed by the device deployment module at the customer site.

In an embodiment, the device deployment module is configured to detect the issue in the network device or receive a report regarding the issue in the network device.

In an embodiment, the device deployment module is further configured to analyze the issue in the network device using a troubleshooting rule set.

In an embodiment, the device deployment module is further configured to transmit information related to the troubleshooting task from the cloud server to a mobile application of a troubleshooting device of the operator.

In an embodiment, the data regarding the issue in the network device is gathered by the operator at the customer site through a Bluetooth connection with the network device, and wherein the operator is not a network expert.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
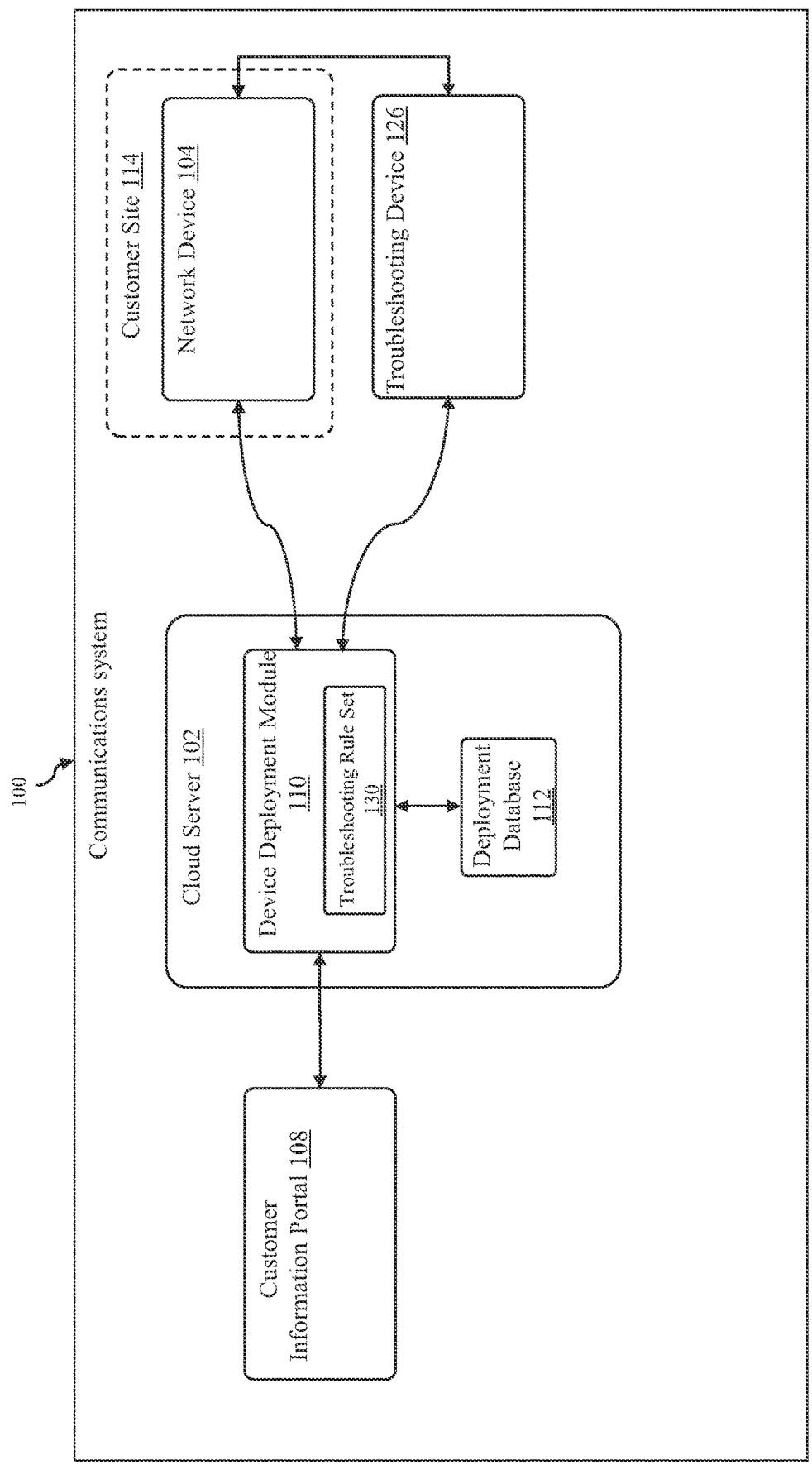
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a network device 104 within a customer site 114, a troubleshooting device 126, and an optional customer information portal 108. The cloud server, the network device, the troubleshooting device, and/or the customer information portal may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one network device, more than one customer site, more than one troubleshooting device, and/or more than one customer information portal. In another example, although the cloud server, the network device, the customer site, the troubleshooting device, and the customer information portal are shown in FIG. 1 as being connected in certain topology, the network topology of the communications system 100 is not limited to the topology shown in FIG. 1.

The cloud server 102 can be used to provide at least one service to a customer site (e.g., to the network device 104 located at the customer site 114). The cloud server may be configured to provide a troubleshooting or debugging service to network devices (e.g., the network device 104) at the customer site. In some embodiments, the cloud server is configured to assign a troubleshooting task for troubleshooting a network device deployed at the customer site to an operator (e.g., assign a troubleshooting task for troubleshooting a network device deployed at the customer site to a mobile application of a troubleshooting device (e.g., the troubleshooting device 126) of the operator), receive data regarding an issue in the network device that is gathered by the operator at the customer site, and recommend a remedy action for the issue in the network device to the operator based on the data regarding the issue in the network device. Because the cloud server can recommend a remedy action for the issue in the network device to the operator based on the data regarding the issue in the network device gathered by the operator, the operator does not need to be a network expert or even a tech-savvy person. For example, the operator may be a layperson (e.g., a worker on-site or an end-user such as an employee) at the customer site. Consequently, troubleshooting or debugging network devices does not need to be performed by a network administrator by connecting to the network devices' console ports and diagnosing the network devices locally at a customer site, which may require specific configuration of the network administrator's end device such as a laptop. By troubleshooting network devices with directions from the cloud server, troubleshooting of network devices can be performed without relying on the expertise of an on-site network expert. Consequently, with directions from the cloud server, a layperson can perform network device troubleshooting or debugging functions in small offices and branches promptly after network device issues appear. Therefore, network downtime can be shortened and the labor cost for network device troubleshooting or debugging can be reduced. The cloud server may receive a report regarding the issue in the network device and/or detect the issue in the network device. In some embodiments, the cloud server is configured to transmit information related to the troubleshooting task from the cloud server to a mobile application of a troubleshooting device of the operator. The data regarding the issue in the network device may be gathered by the operator at the customer site through a Bluetooth connection with the network device. The cloud server may be configured to perform automatic network design for a network to be deployed or installed at the customer site, and/or to provide an activation service (e.g., a location based activation service) to network devices (e.g., the network device 104) at the customer. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations and other data.

In the embodiment depicted in FIG. 1, the cloud server 102 includes a device deployment module 110 and a deployment database 112 configured to store deployment data. In some embodiments, the device deployment module 110 is configured to provide a troubleshooting or debugging service using a troubleshooting rule set 130 for network devices (e.g., the network device 104) deployed and/or to be deployed at the customer site. The troubleshooting rule set 130 may include one or more troubleshooting rules to troubleshoot or debug issues or problems in network devices. In some embodiments, the device deployment module is configured to assign a troubleshooting task for troubleshooting a network device (e.g., the network device 104) deployed at a customer site (e.g., the customer site 114) to an operator, receive data regarding an issue in the network device that is gathered by the operator at the customer site, and recommend a remedy action for the issue in the network device to the operator based on the data regarding the issue in the network device. Because the device deployment module can recommend a remedy action for the issue in the network device to the operator based on the data regarding the issue in the network device gathered by the operator, the operator does not need to be a network expert or even a tech-savvy person. For example, the operator may be a layperson (e.g., a worker or an end-user such as an employee) at the customer site. Therefore, network downtime can be shortened and the labor cost for network device troubleshooting or debugging can be reduced. The device deployment module may receive a report regarding the issue in the network device and/or detect the issue in the network device. In some embodiments, the device deployment module is configured to transmit information related to the troubleshooting task from the cloud server to a mobile application of a troubleshooting device of the operator. The data regarding the issue in the network device may be gathered by the operator at the customer site through a Bluetooth connection with the network device. The device deployment module may be configured to perform a network device deployment service (e.g., a location based network device deployment service) for network devices (e.g., the network device 104) and/or to perform automatic network design for a network at the customer site 114. In some embodiments, the deployment database 112 is configured to store deployment data for a network deployed and/or to be deployed at the customer site (e.g., a list of network devices deployed or to be deployed at the customer site). For example, the deployment database 112 is configured to store troubleshooting information of network devices (e.g., the network device 104) at the customer site, such as location information (e.g., building information, floor information, and/or in-building location information) of a network device having issue at the customer site. In some embodiments, the deployment database is configured to store a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site.

The customer site 114 may include one or more buildings, and each building may include one or more floors. A network that can be deployed at the customer site may include any type of suitable network device or devices, (e.g., the network device 104). For example, the network device may be designated to be deployed to a specific building, a specific floor within a building, and/or a specific location on a floor of a building. The network device may be fully or partially implemented as an Integrated Circuit (IC) device. In some embodiments, the network device is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, the network device may be compatible with Institute of Electrical and Electronics Engineers (IEEE) 802.3 protocol and/or one or more wireless local area network (WLAN) communications protocols, such as IEEE 802.11 protocol. In some embodiments, the network device is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as IEEE 802.11 protocol. In some embodiments, the network device is a wireless station (STA) that wirelessly connects to a wireless AP. For example, the network device may be a laptop, a desktop personal computer (PC), a mobile phone, or other wireless device that supports at least one WLAN communications protocol (e.g., IEEE 802.11)). In some embodiments, the network device is a wired communications device that is compatible with at least one wired local area network (LAN) communications protocol, such as a wired router (e.g., an Ethernet router), a wired switch, a wired hub, or a wired bridge device (e.g., an Ethernet bridge).

The troubleshooting device 126 may be any type of suitable network device that is used by an operator to facilitate the deployment of the network device 104. In some embodiments, the troubleshooting device may be fully or partially implemented as an IC device. In some embodiments, the troubleshooting device is a wireless communications device that includes at least one processor (e.g., a microcontroller, a DSP, and/or a CPU), at least one wireless communications transceiver, at least one wireless communications interface, and/or at least one antenna and that supports at least one wireless communications protocol. In some embodiments, the troubleshooting device is a handheld wireless device, such as a cellular phone or a mobile phone (e.g., a smart phone), a pad computer, a Personal Digital Assistant (PDA) etc. that supports one or more radio frequency (RF) communications protocols, including without limitation, Bluetooth, The Global System for Mobile Communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as an IEEE 802.11 protocol. For example, the troubleshooting device 126 is a wireless communications device, such as a handheld wireless device (e.g., cellular phone or a mobile phone) that supports multiple communications protocols, which may include at least one cellular communications protocol and at least short-range communications protocol (e.g., Bluetooth). In some embodiments, troubleshooting software or App is installed on the troubleshooting device 126 (e.g., a mobile phone or tablet). In some embodiments, the troubleshooting device is configured to receive a troubleshooting task for troubleshooting a network device (e.g., the network device 104) deployed at a customer site (e.g., the customer site 114), pair the troubleshooting device with the network device (e.g., by performing a Bluetooth pairing procedure between the troubleshooting device and the network device) to receive data regarding an issue in the network device, sending the data regarding the issue in the network device to a cloud server, receive a recommendation for a remedy action for the issue in the network device from the cloud server, and at the customer site, perform the remedy action (e.g., resetting the network device or replacing the network device) to address the issue in the network device. Because the troubleshooting device can troubleshoot a network device based on a recommended remedy action, for example, from a remote cloud server, an operator of the troubleshooting device does not need to be a network expert or even a tech-savvy person. For example, the operator is a non-network savvy person such as a contractor, a technician, or an end-user at the customer site 114. Consequently, troubleshooting or debugging network devices does not need to be performed by a network administrator by connecting to the network devices' console ports and diagnosing the network devices locally at a customer site, which may require specific configuration of the network administrator's end device such as a laptop. By troubleshooting network devices with directions from the cloud server, troubleshooting of network devices can be performed without solely relying on the expertise of a network expert. Consequently, with the directions from the cloud server, a layperson can perform network device troubleshooting or debugging functions in small offices and branches promptly after network device issues appear. Therefore, network downtime can be shortened and the labor cost for network device troubleshooting or debugging can be reduced. In some embodiments, at the customer site, the troubleshooting device is paired with the network device through a Bluetooth connection between the network device and the troubleshooting device to receive the data regarding the issue in the network device. In some embodiments, at the customer site, the troubleshooting device is paired with the network device through the Bluetooth connection between the network device and the troubleshooting device using a mobile application of the troubleshooting device. In some embodiments, information related to the troubleshooting task is received at a mobile application of the troubleshooting device. For example, the information related to the troubleshooting task may include location information of the network device and a list of network devices deployed at the customer site or to be deployed at the customer site.

The customer information portal 108, which may be optional to the communications system 100, is configured to receive customer information. In some embodiments, the customer information portal includes a user interface that allows a customer to input information associated with network design for the customer site 114, such as one or more specific requirements or restrictions. For example, the user interface (e.g., a graphical user interface (GUI)) may allow a customer to input information associated with network design for the customer site. The customer information portal may be implemented in hardware (e.g., circuits), software, firmware, or a combination thereof.

In an example operation of the communications system 100, the network device 104 has an issue and goes out of operational state and the local software on the network device may turn on its Bluetooth module to "ready to pair" mode and an LED on the network device turns blinking blue, indicating that it is "ready to pair" over Bluetooth. The device deployment module 110 can detect that the network device is non-operational and automatically opens a troubleshooting ticket and assigns a corresponding troubleshooting task or job to an operator to troubleshoot the issue in the network device. The operator may not be a network expert and may possess only basic knowledge of device troubleshooting. The ticket may contain device specific information, such as a device name and a location of the network device that includes building information, floor information, relative coordinates (e.g., XY coordinates) within a surface area, and/or other location system coordinates (e.g., Global Positioning System (GPS) coordinates) of the network device. The operator goes to the customer site 114 to troubleshoot the issue in the network device using the troubleshooting device 126. For example, a mobile app in the troubleshooting device 126 receives the troubleshooting task, which includes the details of the network device such as device name, location on floor plan, etc. The operator may go physically near the network device and pair the troubleshooting device to the network device over Bluetooth. For example, the operator follows troubleshooting instructions on a mobile app installed in the troubleshooting device, which sends commands to the network device over Bluetooth. The mobile app installed in the troubleshooting device can collect the command output from the network device and forward the command output to the device deployment module at the cloud server 102, which diagnoses the issue in the network device and recommends one or more actions to the operator on the mobile app to address or solve the issue in the network device.

Figure 2:
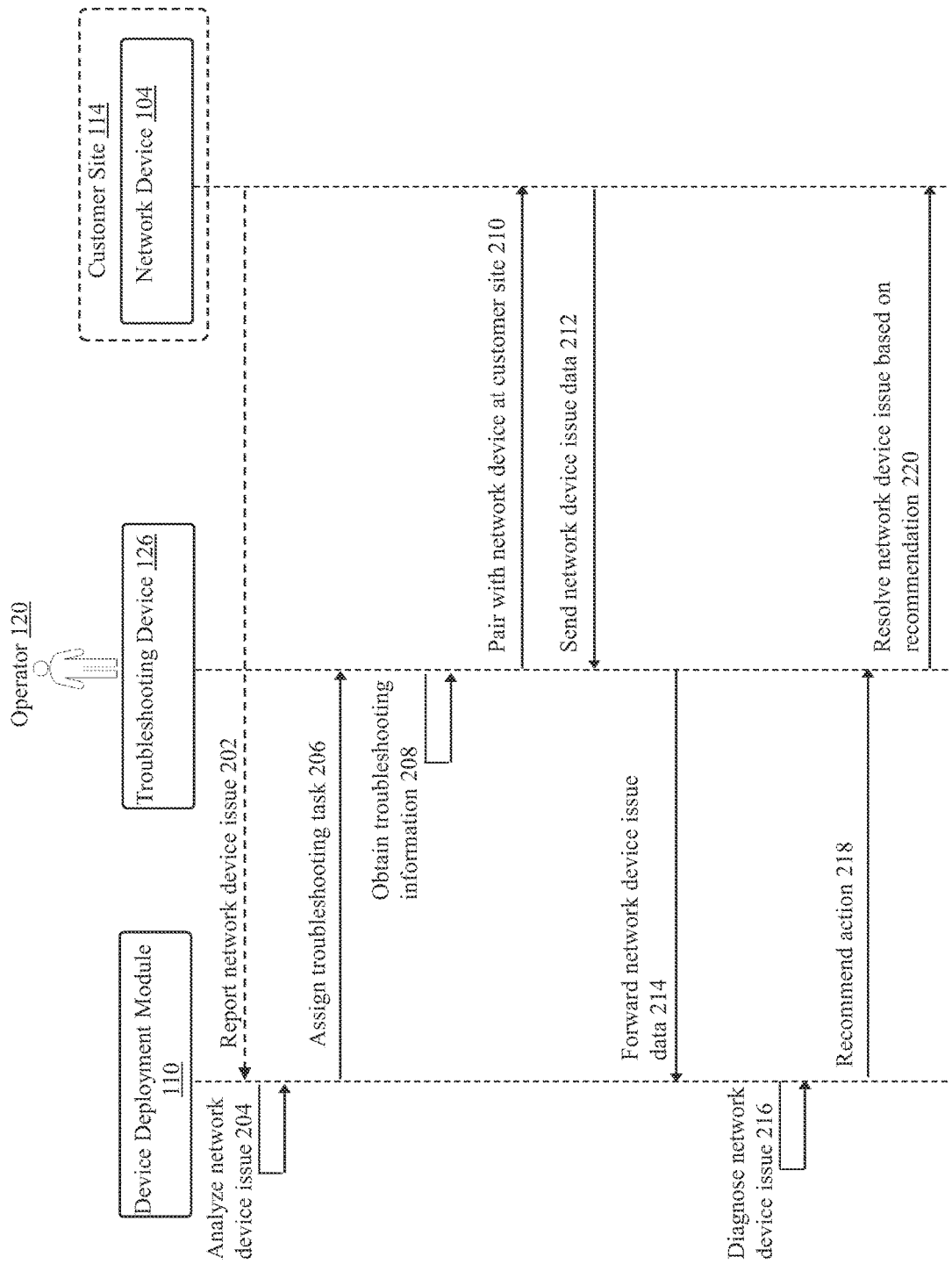
FIG. 2 shows a swim-lane diagram illustrating an example procedure for troubleshooting a network device in the communications system depicted in FIG. 1.

FIG. 2 shows a swim-lane diagram illustrating an example procedure for troubleshooting a network device (e.g., the network device 104) in the communications system 100 depicted in FIG. 1. In this network device troubleshooting procedure, an issue of the network device 104 is automatically generated based on or according to a troubleshooting rule set, which includes one or more troubleshooting rules for troubleshooting issues or problems in network devices, by the device deployment module 110 of the cloud server 102. The network device troubleshooting procedure depicted in FIG. 2 is performed by a non-network savvy person such as a contractor, a technician, or for example, in an emergency situation, a layperson (e.g., a worker or an end-user such as an employee) at the customer site 114, which does not need to be a network expert.

In operation 202, an issue in the network device is reported to the device deployment module 110 of the cloud server 102, for example, by the network device 104. The issue in the network device may include a wired or wireless connectivity issue in the network device such as an issue of a wired port of the network device, an issue of a wired transceiver of the network device, an issue of a wireless transceiver of the network device, and/or an issue of an antenna of the network device, a power issue in the network device such as an overvoltage in the network device, an undervoltage in the network device, an overcurrent in the network device, and/or an undercurrent in the network device, and/or an operation issue in the network device such as low throughput in the network device and/or a critical error that causes the network device to become non-functional. In some embodiments, an issue in the network device is noticed or detected by the device deployment module of the cloud server, instead of being reported to the device deployment module. For example, when the network device encounters a critical error and stops functioning, the device deployment module may detect the state of the device deployment module.

In operation 204, the device deployment module 110 of the cloud server 102 analyzes the issue in the network device 104, for example, using the troubleshooting rule set 130, which may include one or more troubleshooting rules to troubleshoot or debug issues or problems in network devices. If the device deployment module determines that the issue in the network device needs to be addressed by local or physical access to the network device, the device deployment module automatically opens a troubleshooting ticket and assigns a troubleshooting task to an operator 120 in operation 206. The operator does not need to be a network expert. In an emergency situation, the operator is a layperson (e.g., a worker or an end-user such as an employee) at the customer site 114, which does not have expertise in network operation or network device troubleshooting. In some embodiments, the troubleshooting task includes device specific information, such as a device name and a location of the network device that includes building information, floor information, relative coordinates (e.g., XY coordinates) within a surface area, and/or other location system coordinates (e.g., GPS coordinates) of the network device.

In operation 208, using the troubleshooting device 126, the operator 120 obtains troubleshooting information based on the assigned troubleshooting task from the device deployment module 110 of the cloud server 102. In some embodiments, the troubleshooting device is a handheld wireless device, such as a cellular phone or a mobile phone (e.g., a smart phone), a pad computer, a PDA etc., and the operator uses a mobile app (e.g., a mobile application from an application store (e.g., Android Market, Apple App Store, Amazon Appstore, carrier applications stores, etc.)) installed on the handheld wireless device to obtain troubleshooting information based on the assigned troubleshooting task. For example, the troubleshooting information may include a list of network devices deployed or to be deployed at the customer site 114 and/or location information of a network device (e.g., the network device 104) having issue. In some embodiments, a mobile app installed at the troubleshooting device extracts a list of network devices deployed or to be deployed at the customer site 114 from the assigned troubleshooting task and location information of a network device (e.g., the network device 104) having issue. In these embodiments, the mobile app points or directs the operator to the location of a network device having issue.

In operation 210, once the operator 120 is at the customer site 114, the operator pairs the troubleshooting device 126 with the network device 104, for example, through a short-range communications link 324 (e.g., a Bluetooth communications link). In some embodiments, the operator uses a mobile app installed on the troubleshooting device to pair the troubleshooting device to the network device over Bluetooth. In these embodiments, instructions for collecting troubleshooting data over Bluetooth is sent to the troubleshooting device and available on the mobile app.

Figure 3:
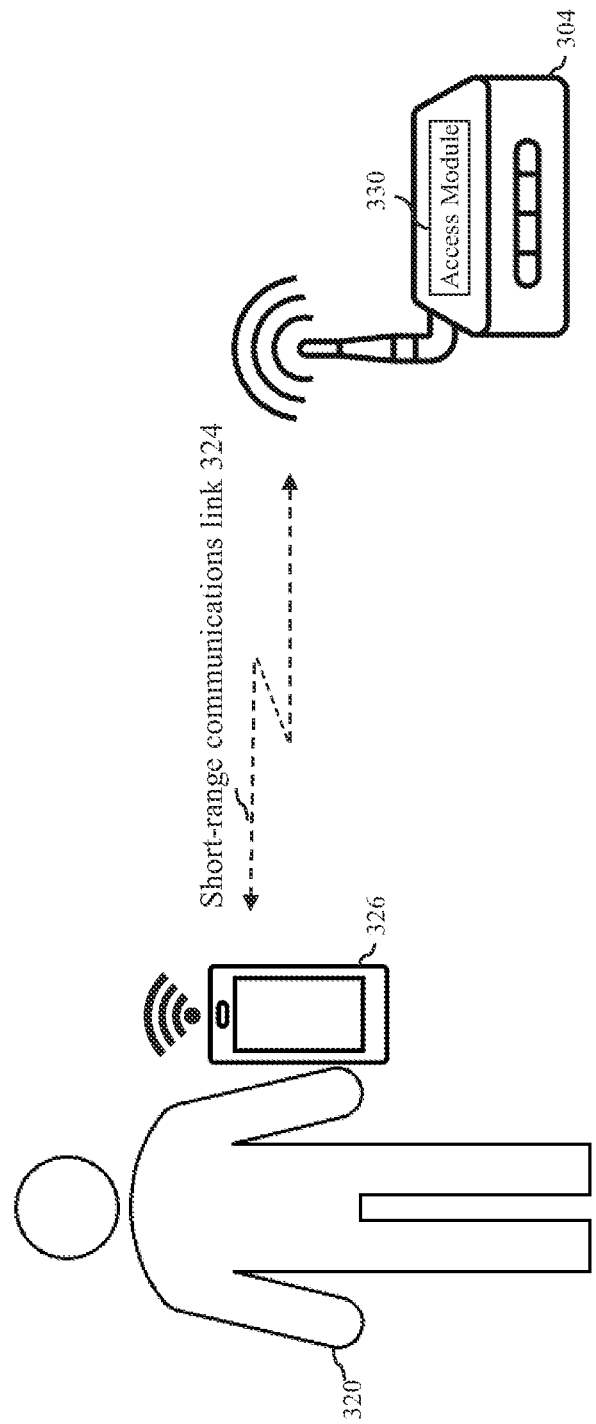
FIG. 3 depicts an operator having a troubleshooting device wirelessly connecting to a network device to be troubleshot or debugged.

FIG. 3 depicts an operator 320 having a troubleshooting device 326 wirelessly connecting to a network device 304 to be troubleshot or debugged. The network device 304 and the troubleshooting device 326 depicted in FIG. 3 are embodiments of the network device 104 and the troubleshooting device 126 depicted in FIG. 1. However, the network device 104 and the troubleshooting device 126 depicted in FIG. 1 are not limited to the embodiment shown in FIG. 3. In the embodiment depicted in FIG. 3, the network device 304 contains an access module 330 configured to communicate with the troubleshooting device 326 (e.g., a mobile app at the troubleshooting device 326). The access module 330 may be implemented in hardware (e.g., circuits), software, firmware, or a combination thereof. In an example operation, the operator 320 pairs the troubleshooting device 326 (e.g., a cellular phone or a mobile phone (e.g., a smart phone)) with the access module 330 (e.g., an access application) of the network device 304 through a short-range communications link 324 (e.g., a Bluetooth communications link).

Turning back to the swim-lane diagram shown in FIG. 2, in operation 212, the network device 104 sends network device issue data to the troubleshooting device 126 of the operator 120, for example, through Bluetooth or other short-range communications. The operator 120 can collect the network device issue data using the mobile app and forward the network device issue data to the device deployment module 110 of the cloud server 102 in operation 214.

In operation 216, the device deployment module 110 of the cloud server 102 diagnoses the network device issue in the network device 104, for example, using the troubleshooting rule set 130, which may include one or more troubleshooting rules to troubleshoot or debug issues or problems in network devices. In operation 218, the device deployment module 110 of the cloud server 102 recommends or proposes one or more actions to the operator 120 to resolve the issue in the network device 104. Because the cloud server can recommend a remedy action for an issue in the network device to the operator based on the data regarding the issue in the network device gathered by the operator, the operator does not need to be a network expert or even a tech-savvy person. For example, the operator may be a layperson (e.g., a worker or an end-user such as an employee) at the customer site. Consequently, troubleshooting or debugging network devices does not need to be performed by a network administrator by connecting to the network devices' console ports and diagnosing the network devices locally at a customer site, which may require specific configuration of the network administrator's end device such as a laptop. By troubleshooting network devices with the directions from the cloud server, troubleshooting of network devices can be performed without solely relying on the expertise of a network expert. Consequently, with the directions from the cloud server, a layperson can perform network device troubleshooting or debugging functions in small offices and branches, promptly after network device issues appear. Therefore, network downtime can be shortened and the labor cost for network device troubleshooting or debugging can be reduced.

In operation 220, based on the recommended action(s) from the device deployment module 110, the operator 120 resolves or attempt to resolve the issue in the network device 104 (e.g., using the troubleshooting device 126), for example, by preforming the recommended action(s). In some embodiments, the operator may fix a loose connection between a network cable and a wired port of the network device, fix a loose connection between an antenna of the network device and a corresponding transceiver of the network device, fix a loose connection between a power cable and a power input of the network device, reset the network device, and/or replace the network device. In some embodiments, the operator uses the troubleshooting device 126 to reset a component (e.g., a software application or a transceiver) of the network device and/or to uninstall and reinstall software (e.g., an operation system or a software application installed on an operation system) of the network device.

Figure 4:
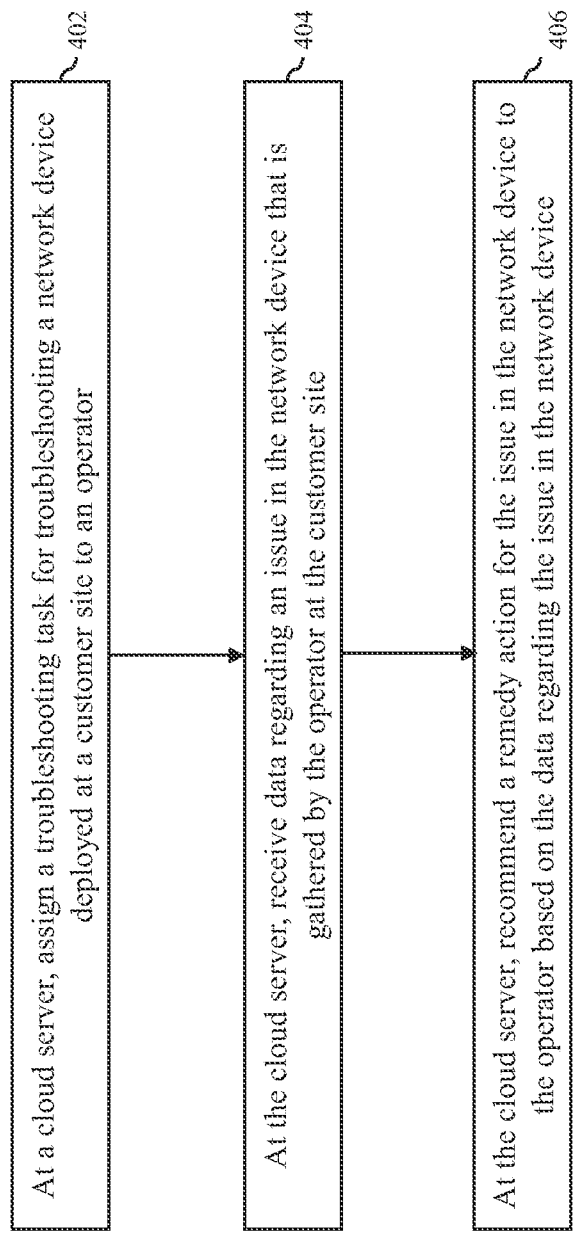
FIG. 4 is a process flow diagram of a method for network device troubleshooting in accordance to an embodiment of the invention.

FIG. 4 is a process flow diagram of a method for network device troubleshooting in accordance to an embodiment of the invention. According to the method, at block 402, at a cloud server, a troubleshooting task for troubleshooting a network device deployed at a customer site is assigned to an operator, for example, assigned to a mobile application of a troubleshooting device (e.g., the troubleshooting device 126) of the operator. In some embodiments, a report regarding the issue in the network device is received at the cloud server. In some embodiments, the issue in the network device is detected at the cloud server. In some embodiments, information related to the troubleshooting task is transmitted from the cloud server to a mobile application of a troubleshooting device of the operator. In some embodiments, the operator is not a network expert. For example, the operator is a layperson (e.g., a worker or an end-user such as an employee) at the customer site. At block 404, at the cloud server, data regarding an issue in the network device that is gathered by the operator, for example, via a troubleshooting device (e.g., the troubleshooting device 126), at the customer site is received. In some embodiments, the data regarding the issue in the network device is gathered by the operator at the customer site through a Bluetooth connection with the network device. At block 406, at the cloud server, a remedy action for the issue in the network device is recommended to the operator based on the data regarding the issue in the network device. In some embodiments, the issue in the network device is analyzed at the cloud server using a troubleshooting rule set. The operations 402, 404, 406 in the flow diagram of FIG. 4 may correspond to the operations 206, 214, 218 in the swim-lane diagram of FIG. 2. The cloud server may be similar to, the same as, or a component of the cloud server 102 depicted in FIG. 1. The network device may be similar to, the same as, or a component of the network device 104 depicted in FIG. 1. The customer site may be similar to, the same as, or a component of the customer site 114 depicted in FIG. 1. The operator may be similar to, the same as, or a component of the operator 320 depicted in FIG. 3.

Figure 5:
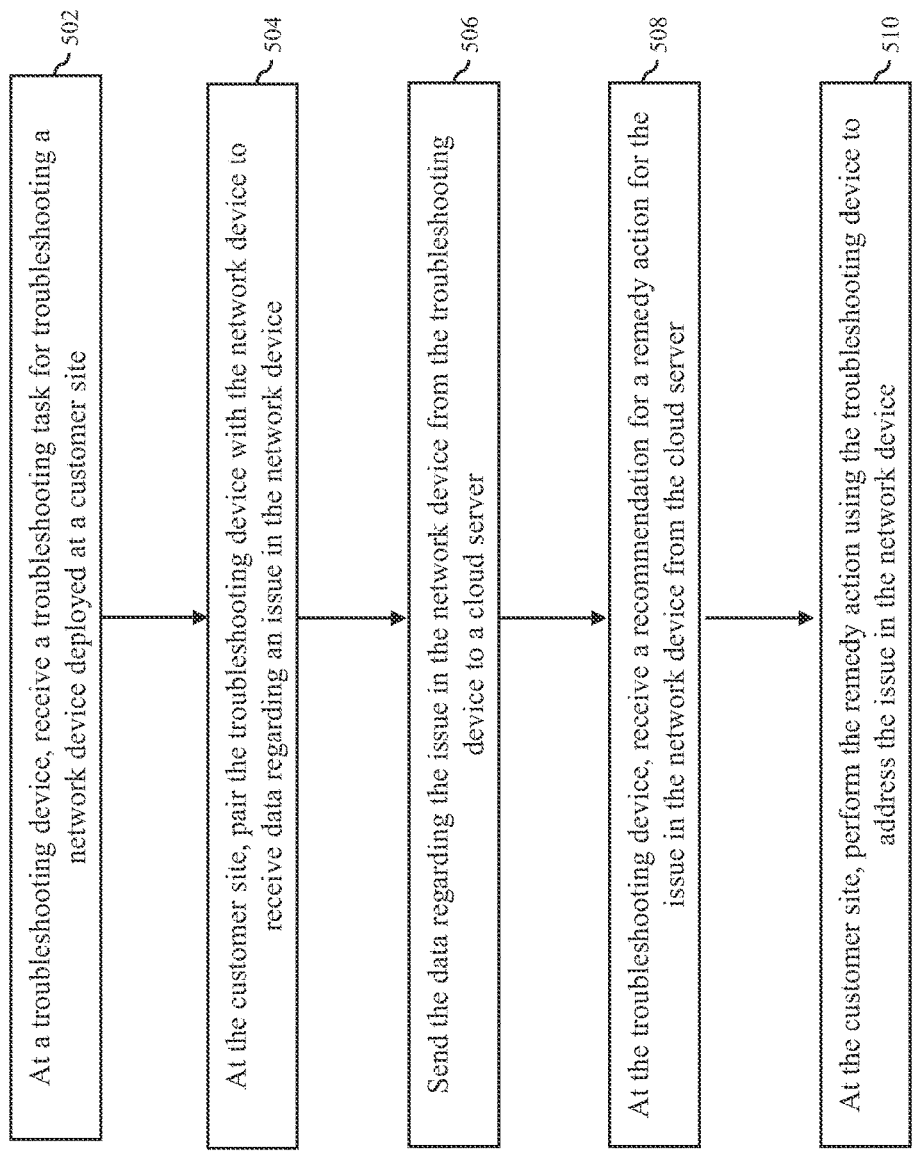
FIG. 5 is a process flow diagram of a method for network device troubleshooting in accordance to another embodiment of the invention.

FIG. 5 is a process flow diagram of a method for network device troubleshooting in accordance to another embodiment of the invention. According to the method, at block 502, at a troubleshooting device, a troubleshooting task for troubleshooting a network device deployed at a customer site is received. In some embodiments, information related to the troubleshooting task is received at a mobile application of the troubleshooting device. For example, the information related to the troubleshooting task may include location information of the network device and a list of network devices deployed at the customer site or to be deployed at the customer site. In some embodiments, the troubleshooting device is a handheld wireless device. In some embodiments, an operator of the troubleshooting device is a layperson, not a network expert. At block 504, at the customer site, the troubleshooting device is paired with the network device to receive data regarding an issue in the network device. In some embodiments, at the customer site, the troubleshooting device is paired with the network device through a Bluetooth connection between the network device and the troubleshooting device to receive the data regarding the issue in the network device. For example, at the customer site, the troubleshooting device is paired with the network device through the Bluetooth connection between the network device and the troubleshooting device using a mobile application of the troubleshooting device and an access application executing on the network device. At block 506, the data regarding the issue in the network device is sent from the troubleshooting device to a cloud server. At block 508, at the troubleshooting device, a recommendation for a remedy action for the issue in the network device is received from the cloud server. At block 510, at the customer site, the remedy action is performed using the troubleshooting device to address the issue in the network device. The operations 502, 504, 506, 508, 510 in the flow diagram of FIG. 5 may correspond to the operations 206, 210, 214, 218, 220 in the swim-lane diagram of FIG. 2. The cloud server may be similar to, the same as, or a component of the cloud server 102 depicted in FIG. 1. The network device may be similar to, the same as, or a component of the network device 104 depicted in FIG. 1. The troubleshooting device may be similar to, the same as, or a component of the troubleshooting device 126 depicted in FIG. 1. The customer site may be similar to, the same as, or a component of the customer site 114 depicted in FIG. 1.

Figure 6:
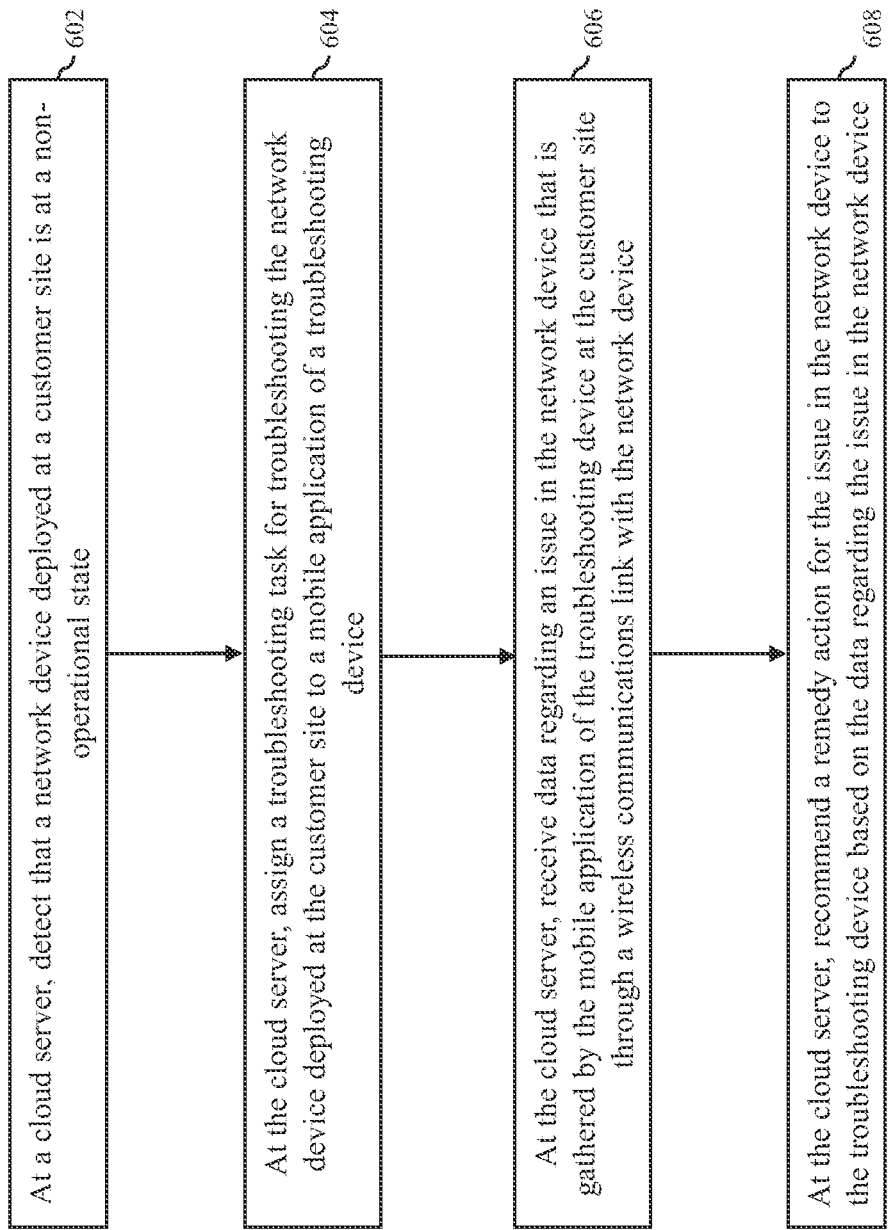
FIG. 6 is a process flow diagram of a method for network device troubleshooting in accordance to another embodiment of the invention.

FIG. 6 is a process flow diagram of a method for network device troubleshooting in accordance to another embodiment of the invention. According to the method, at block 602, at a cloud server, a non-operational state of a network device deployed at a customer site is detected. At block 604, at the cloud server, a troubleshooting task for troubleshooting the network device deployed at the customer site is assigned to a mobile application of a troubleshooting device. At block 606, at the cloud server, data regarding an issue in the network device that is gathered by the mobile application of the troubleshooting device at the customer site through a wireless communications link with the network device is received. At block 608, at the cloud server, a remedy action for the issue in the network device is recommended to the troubleshooting device based on the data regarding the issue in the network device. The operations 602, 604, 606, 608 in the flow diagram of FIG. 6 may correspond to the operations 206, 214, 218 in the swim-lane diagram of FIG. 2. The cloud server may be similar to, the same as, or a component of the cloud server 102 depicted in FIG. 1. The network device may be similar to, the same as, or a component of the network device 104 depicted in FIG. 1. The troubleshooting device may be similar to, the same as, or a component of the troubleshooting device 126 depicted in FIG. 1. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network device troubleshooting, the method comprising:
at a cloud server, automatically detecting an issue in a network device deployed at a customer site when the network device encounters a critical error and stops functioning, wherein the issue in the network device comprises at least one of a wired or wireless connectivity issue in the network device, a power issue in the network device, and an operation issue in the network device;
analyzing the issue in the network device at the cloud server using a troubleshooting rule set, wherein the troubleshooting rule set includes one or more troubleshooting rules to troubleshoot or debug issues or problems in network devices;
at the cloud server, assigning a troubleshooting task for troubleshooting the network device to an operator when the cloud server determines that the issue in the network device needs to be addressed by local or physical access to the network device, wherein at the cloud server, assigning the troubleshooting task for troubleshooting the network device deployed at the customer site to the operator comprises transmitting information related to the troubleshooting task from the cloud server to a mobile application of a troubleshooting device of the operator, wherein the information related to the troubleshooting task comprises device name information and location information of the network device, wherein the location information of the network device includes building information, floor information, relative coordinates within a surface area, and a plurality of positioning system coordinates of the network device, wherein troubleshooting or debugging the network device is not performed by connecting to the network device's console port and diagnosing the network device locally at the customer site, wherein the operator does not have expertise in network operation or network device troubleshooting, wherein the operator is a layperson at the customer site and is not a network administrator, wherein at the customer site, the troubleshooting device is paired wirelessly with the network device to receive data regarding the issue in the network device, and wherein the mobile application points or directs the operator to a location of the network device;
at the cloud server, receiving data regarding the issue in the network device that is gathered by the operator at the customer site; and
at the cloud server, recommending a remedy action for the issue in the network device to the operator based on the data regarding the issue in the network device, wherein the remedy action comprises fixing a loose connection between a network cable and a wired port of the network device, fixing a loose connection between an antenna of the network device and a corresponding transceiver of the network device, fixing a loose connection between a power cable and a power input of the network device, resetting the network device, or replacing the network device, and wherein based on the remedy action, the operator uses the troubleshooting device to reset a transceiver of the network device and to uninstall and reinstall an operation system software of the network device.

2. The method of claim 1, wherein the data regarding the issue in the network device is gathered by the operator at the customer site through a Bluetooth connection with the network device.

3. The method of claim 1, wherein the operator is a layperson at the customer site.

4. A method for network device troubleshooting, the method comprising:

at a mobile application of a troubleshooting device, receiving a troubleshooting task for troubleshooting a network device deployed at a customer site from a cloud server when the cloud server determines that an issue in the network device needs to be addressed by local or physical access to the network device, wherein at the cloud server, the issue in the network device deployed at the customer site is automatically detected when the network device encounters a critical error and stops functioning, wherein the issue in the network device comprises at least one of a wired or wireless connectivity issue in the network device, a power issue in the network device, and an operation issue in the network device, wherein the issue in the network device is analyzed at the cloud server using a troubleshooting rule set, wherein the troubleshooting rule set includes one or more troubleshooting rules to troubleshoot or debug issues or problems in network devices, wherein at the mobile application of the troubleshooting device, receiving the troubleshooting task for troubleshooting the network device deployed at the customer site comprises receiving information related to the troubleshooting task at the mobile application of the troubleshooting device, wherein the information related to the troubleshooting task comprises device name information and location information of the network device, wherein the location information of the network device includes building information, floor information, relative coordinates within a surface area, and a plurality of positioning system coordinates of the network device, wherein troubleshooting or debugging the network device is not performed by connecting to the network device's console port and diagnosing the network device locally at the customer site, wherein the operator does not have expertise in network operation or network device troubleshooting, wherein the operator is a layperson at the customer site and is not a network administrator, and wherein the mobile application points or directs the operator to a location of the network device;

at the customer site, pairing the troubleshooting device wirelessly with the network device to receive data regarding the issue in the network device;

sending the data regarding the issue in the network device from the troubleshooting device to the cloud server;

at the troubleshooting device, receiving a recommendation for a remedy action for the issue in the network device from the cloud server, wherein the remedy action comprises fixing a loose connection between a network cable and a wired port of the network device, fixing a loose connection between an antenna of the network device and a corresponding transceiver of the network device, fixing a loose connection between a power cable and a power input of the network device, resetting the network device, or replacing the network device, and wherein based on the remedy action, the operator uses the troubleshooting device to reset a transceiver of the network device and to uninstall and reinstall an operation system software of the network device; and at the customer site, performing the remedy action to address the issue in the network device.

5. The method of claim 4, wherein at the customer site, pairing the troubleshooting device wirelessly with the network device to receive the data regarding the issue in the network device comprises at the customer site, pairing the troubleshooting device with the network device through a Bluetooth connection between the network device and the troubleshooting device to receive the data regarding the issue in the network device.

6. The method of claim 5, wherein at the customer site, pairing the troubleshooting device wirelessly with the network device through the Bluetooth connection between the network device and the troubleshooting device comprises at the customer site, pairing the troubleshooting device with the network device through the Bluetooth connection between the network device and the troubleshooting device using the mobile application of the troubleshooting device.

7. The method of claim 4, wherein the information related to the troubleshooting task comprises the location information of the network device and a list of network devices deployed at the customer site or to be deployed at the customer site.

8. The method of claim 4, wherein the troubleshooting device is a handheld wireless device.

9. A cloud server comprising:
a device deployment module configured to:
automatically detecting an issue in a network device deployed at a customer site when the network device encounters a critical error and stops functioning, wherein the issue in the network device comprises at least one of a wired or wireless connectivity issue in the network device, a power issue in the network device, and an operation issue in the network device;
analyze the issue in the network device using a troubleshooting rule set, wherein the troubleshooting rule set includes one or more troubleshooting rules to troubleshoot or debug issues or problems in network devices;
assign a troubleshooting task for troubleshooting the network device to an operator when the device deployment module determines that the issue in the network device needs to be addressed by local or physical access to the network device, wherein the device deployment module is further configured to transmit information related to the troubleshooting task to a mobile application of a troubleshooting device of the operator, wherein the information related to the troubleshooting task comprises device name information and location information of the network device, wherein the location information of the network device includes building information, floor information, relative coordinates within a surface area, and a plurality of positioning system coordinates of the network device, wherein troubleshooting or debugging the network device is not performed by connecting to the network device's console port and diagnosing the network device locally at the customer site, wherein the operator does not have expertise in network operation or network device troubleshooting, wherein the operator is a layperson at the customer site and is not a network administrator, wherein at the customer site, the troubleshooting device is paired wirelessly with the network device to receive data regarding the issue in the network device, and wherein the mobile application points or directs the operator to a location of the network device;
receive data regarding an issue in the network device that is gathered by the operator at the customer site; and
recommend a remedy action for the issue in the network device to the operator based on the data regarding the issue in the network device, wherein the remedy action comprises fixing a loose connection between a network cable and a wired port of the network device, fixing a loose connection between an antenna of the network device and a corresponding transceiver of the network device, fixing a loose connection between a power cable and a power input of the network device, resetting the network device, or replacing the network device, and wherein based on the remedy action, the operator uses the troubleshooting device to reset a transceiver of the network device and to uninstall and reinstall an operation system software of the network device; and a deployment database connected to the device deployment module and configured to store a list of network devices deployed or to be deployed by the device deployment module at the customer site.

10. The cloud server of claim 9, wherein the data regarding the issue in the network device is gathered by the operator at the customer site through a Bluetooth connection with the network device, and wherein the operator is not a network expert.

* * * * *